3,679,481
PROCESS OF MANUFACTURING SINTERED CARRIER TYPE NEGATIVE ELECTRODES FOR ALKALINE STORAGE CELLS
Emile Jean Lucien Pinard, Bordeaux, France, assignor to Societe des Accumulateurs Fixes et de Traction (Societe Anonyme), Romainville, France
No Drawing. Filed Mar. 1, 1971, Ser. No. 119,867
Claims priority, application France, Mar. 26, 1970, 10,933
Int. Cl. H01m 35/18
U.S. Cl. 136—24                 15 Claims

ABSTRACT OF THE DISCLOSURE

A method of preparing negative electrodes for alkaline storage cells by incorporating active electrode material into porous metal carriers, for example, of sintered nickel by impregnating the carrier with an acidified cadmium salt solution, then precipitating cadmium hydroxide and incidentally nickel hydroxide in its pores by immersion in an alkali metal solution, then washing and drying the precipitate bearing carrier, thereafter heating such carrier at temperatures ranging from 200 to 500° C. in air or inert atmosphere for a selected period of time to convert the nickel and cadmium hydroxides into respective oxides, thereafter rehydrating the heated oxide bearing carrier by immersion in an aqueous liquid such as water or an aqueous solution of a nickel salt or an alkali metal hydroxide maintained at a temperature of approximately 80° C. for approximately 1 to 2 hours. This converts the cadmium oxide to cadmium hydroxide without substantially affecting the nickel oxide. Subsequently washing the so-treated carrier bearing cadmium hydroxide and such nickel oxide and finally washing and finally drying the electrode preferably in carbonated air. The resultant negative electrode has a materially reduced amount of deleterious or parasitic positive active material and increased porosity and flexibility as compared with like negative electrodes produced by conventional carrier impregnating and precipating procedure. Negative electordes resulting from the process of this invention and alkaline storage cells with such negative electrodes are also disclosed.

BACKGROUND OF INVENTION

This invention relates to improvements in the manufacture of negative electrodes comprising sintered porous metallic carriers bearing active negative material intended for use in alkaline storage cells and more especially to the manufacture of negative electrodes whose active negative material is a cadmium compound such as cadmium hydroxide and which are particularly useful in sealed cells. The invention also relates to the electrodes resulting from the method of this invention and to electrochemical storage cells containing such electrodes.

The conventional manufacturing method for negative electrodes whose active material is cadmium hydroxide consists in impregnating a sintered porous nickel carrier with a solution of a cadmium salt, preferably cadmium nitrate which is slightly acidified, e.g. by nitric acid, into which the carrier is immersed or dipped, then in immersing the thus impregnated carrier in an alkaline solution e.g. of potassium hydroxide or preferably sodium hydroxide, preferably at high temperature in order to precipitate cadmium hydroxide in the pores of the carrier. This procedure is usually repeated several times until a suitably selected amount of cadmium hydroxide has been deposited in the pores of the sintered carrier.

One drawback of this method is that the impregnating solutions being acid and oxidizing also attack the nickel metal of the carrier itself thus producing nickel salts which, in presence of the alkaline solution, precipitate as nickel hydroxide at the same time as the cadmium salts precipitate as cadmium hydroxide. The negative active material in the pores of the carrier thus then contains a certain amount of parasitic positive active material, i.e., nickel hydroxide the presence of which is undesirable. As one disadvantageous result, the pores of the electrode then in part contain an absolutely useless mass of positive active material which lessens both the porosity of the negative electrode and the conductivity between the active material thereof and the conductive carrier without contributing to the useful electrical capacity of the electrode. Moreover, as another disadvantageous result, during overdischarge of cells with such electrode, the presence of this positive active material therein delays the oxygen evolution on the negative electrode, thus preventing the start of the oxygen cycle in which the oxygen evolved on the anode (the negative electrode on discharge) is consumed on the cathode (the positive electrode on discharge) by electrochemical reduction reactions. If this oxygen is not evolved on the anode (negative electrode) after the negative active material has been discharged because it serves to oxidize the parasitical positive active material contained in the negative electrode, it will not then be available to be reduced by absorbing electrons. These electrons then reduce water, thus producing hydrogen, which is, of course, undesirable.

This phenomenon may occur at the end of the discharge in the cell having the smallest capacity among the cell of a battery.

It is particularly troublesome in sealed cells where hydrogen resorption is known to be difficult.

Research efforts have already been aimed at remedying this drawback, but such research has generally been directed, with indifferent success, towards inhibiting the attack of the sintered carrier by the impregnating solutions. Inhibitors of organic as well as inorganic types have been suggested as additives to these solutions, but they obviously incur the risk of introducing impurities into the active materials which can be noxious.

Objects and features of the present invention are to remedy these drawbacks and make possible the manufacture of sintered carrier type negative electrodes that are substantially free of undesired positive active materials without at the same time introducing any other impurities.

Further objects and features of the invention are the production of negative electrodes of high porosity and high flexibility.

SUMMARY OF INVENTION

According to the present invention, after the sintered carriers intended to be made into negative electrodes have been impregnated in the conventional two-stage immersion technique hereinabove outlined, washed with water and dried, and which then contain precipitated negative active material such as cadmium hydroxide and undesirable precipitated positive active material such as nickel hydroxide in their pores, these multiprecipitate bearing carriers are then subjected to a heating step at a temperature ranging from 200 to 500° C. either in air or in an inert atmosphere for a suitable period of time, so that the precipitated cadmium and nickel hydroxides in the pores of the carrier are converted or transformed respectively into their oxides. In a preferred embodiment of the invention, the heating step is effected at a temperature of about 250° C. for a period of about one hour. Thereafter, the nickel oxide and cadmium oxide bearing electrode carriers are submitted to a rehydrating step and finally washed and dried.

The rehydrating step comprises immersion of the nickel oxide and cadmium oxide bearing porous carriers in a heated aqueous liquid such as pure (distilled) water maintained at a temperature of about 80° C. or more preferably a dilute aqueous solution of nickel sulfate at a concentration advantageously of about 2.5 g./l. also maintained at said temperature of about 80° C. or alternatively in a sodium hydroxide solution at a concentration advantageously of about 250 g./l. also maintained at said temperature of about 80° C. In this rehydration step, the immersion in the selected heated aqueous liquid may be maintained for from approximately 1 to approximately 2 hours.

Subsequent to completion of the rehydrating step, the product of that step is washed and then dried preferably in de-carbonated air to yield the desired negative electrode embodying the invention.

It has been found that during the rehydrating step only the cadmium oxide is effected by the selected heated aqueous solution and that the nickel oxide is not substantially affected thereby but remains in its electrochemically inert oxide form. Moreover, during the aforesaid heating step effected prior to the rehydration step, the volume of the parasitic positive mass, i.e. nickel hydroxide, is reduced by more than half by being converted from nickel hydroxide to nickel oxide, so that the porosity of the final product is increased over that of the product of the two above-described conventional impregnation and precipitation steps that were effected prior to carrying out said heating step.

It has also been found that practice of the process according to the invention has an additional advantage in that it facilitates the elimination of residual nitrates remaining in the product resulting from the two conventional preliminary conventional impregnation and precipitation steps by simple washing because such nitrates are thus made soluble, so that the usually required electrochemical purification procedure of electrodes produced by the conventional impregnation and precipitation steps only and consisting in cathodically and anodically polarizing such electrodes in an alkaline solution in order to rid them of their impurities, which usually follow the impregnation and precipitation steps of the conventional method becomes unnecessary.

Moreover, the negative electrodes produced in accord with the practice of the method of the invention present an increased flexibility over the electrode product of the said conventional method. This is very advantageous especially when such electrodes are to be used for manufacturing cells with wound electrodes. Whereas the flexibility of electrodes resulting from conventional impregnation and precipitation procedure (which may be tested by the deflection of a resulting electrode held at one end and submitted at the other end to an increasing load) is doubled by the subsequent electrochemical purifying procedure hereinabove mentioned as compared with an electrode which has not been so purified, I have found that this flexibility is increased three times in electrodes prepared according to the method of this invention employing the said heating step at 250° C. followed by a rehydration step in a sodium hydroxide solution.

Negative electrodes prepared according to this invention are therefore advantageous because of their superior porosity, flexibility and relative freedom of presence of active positive materials in substantial and deleterious amounts as well as freedom from other impurities.

The invention will be better understood with the following non-limitative examples.

Other objects and features of the invention will become apparent from the following detailed description.

DETAILED DESCRIPTION

Example I

A band or strip of porous sintered nickel carrier material in conventional manner is immersed in an acidified salt solution of the desired active material, for example, a solution of cadmium nitrate to impregnate its pores, followed by immersion in an alkaline solution, for example, of sodium hydroxide at elevated temperature to precipitate cadimum hydroxide in the pores of the carrier, this precipitation being accompanied, too, by precipitation into the carrier pores of the nickel from the carrier which has been attacked by the impregnation solution and its conversion into nickel hydroxide by said alkaline soluton, said two immersion steps being repeated as needed for several times in seriatim until a desired quantity of cadmium hydroxide deposit has been effected in the pores of the carrier accompanied, of course, by precipitation of parasitic and undesirable nickel hydroxide from the nickel of the carrier. The precipitate bearing carrier product of these impregnation and precipitation steps is then washed and dried and further subjected to a heating step in air at about 250° C. for about one hour to effect conversion of the precipitated nickel hydroxide and cadmium hydroxide into nickel oxide and cadmium oxide. Subsequently, a rehydration step is effected by immersion of the nickel oxide and cadmium oxide bearing carrier product of said heating step in an aqueous nickel sulfate solution having a concentration of about 2.5 g./l. maintained at a temperature of about 80° C. for about two hours resulting thus in reconversion of the cadmium oxide content into cadmium hydroxide without, however, any substantial effect on the nickel oxide content. The end product of the rehydrating step is then finally washed and finally dried preferably in decarbonated air, thus producing the desired negative highly porous, flexible sintered carrier electrode bearing in its pores as negative active material cadmium hydroxide with some electrochemically inert nickel oxide.

Further electrochemical purification of such a negative electrode is not found necessary.

Example II

The procedure of Example I is followed with a similar sintered nickel carrier band including the rehydrating step thereof with substitution for the aqueous nickel sulfate solution of Example I of a sodium hydroxide solution maintained at about 80° C. and whose concentration is approximately 250 g./l. Treatment time in this sodium hydroxide rehydrating step is likewise about two hours. This is followed as in Example I by final washing and drying preferably in de-carbonated air.

The products of Examples I and II subsequent to their final dryings and washings have been subjected to comparison with a negative electrode prepared according to the hereinabove described conventional two-stage impregnating and precipitating procedure and with a further similar conventionally prepared negative electrode subjected further to the hereinabove described conventional electrochemical purification procedure.

These comparison tests were made for the purpose of:

(a) Determining respectively the extent of nitrogen compound and carbonate content in each such negative electrode;

(b) Measurement in each such electrode by X-ray analysis of the intensity of rays 100, 111 and 104 respectively for detection of the presence therein of cadmium hydroxide $Cd(OH)_2$, cadmium oxide CdO and cadmium carbonate $CdCO_3$;

(c) Determination in each such electrode of the specific surface of cadmium hydroxide $Cd(OH)_2$ from the average size of crystallites in the directions 001 and 100, and (d) A determination of the electrical capacity of each such electrode at 10 hour discharge rate, all electrodes tested having like dimensions.

These results are assembled in tabular form below:

Alkaline storage cells utilizing negative electrodes resulting from the practice of this invention may be assembled together with suitable positive electrodes and interposed separators and with conventional alkaline electrolytes. The electrode-separator assemblies may be spirally wound, if desired, and in all event enclosed in appropriate sealed containers in known manner.

While specific embodiments of the invention have been hereinabove described, variations in practice within the

TABLE

| Nature of Electrode | Nitrogen (mg./dm.²) | CO₃ (mg./dm.²) | I₁₀₀ Cd(OH)₂ | I₁₁₁ CdO | I₁₀₄ CdCO₃ | Specific surface (m.²/g.) | Capacity (Ah./dm.²) |
|---|---|---|---|---|---|---|---|
| Conventional without processing | 4.6 | 460 | 0.93 | 0 | 0.07 | 30 | 4.06 |
| Conventional with electro-chemical purification | 3.2 | 91 | | | | | 4.16 |
| Conventional plus heating followed by rehydration in water plus SO₄Ni (2.5 g./l.) (Example I) | 1.0 | 355 | 0.71 | 0.17 | 0.12 | 47 | 4.31 |
| Conventional plus heating followed by rehydration in sodium hydroxide solution (250 g./l.) Example II | 0.8 | 67 | 0.94 | 0.08 | 0 | 38 | 4.03 |

From this table:

(1) It can be seen by reference to its specific surface column that: the rehydration of CdO after the heating step used in preparing the electrodes of Examples I and II produces a cadmium hydroxide that is more finely divided than that of the initial precipitated $Cd(OH)_2$ present in the conventionally processed negative electrode.

(2) It can be seen by reference to the nitrogen content that in electrodes of both Examples I and II which included heating and rehydration during preparation, the denitration is more efficient than with electrodes produced either by conventional procedure or conventional procedure followed by the electrochemical purification.

(3) It can be seen by reference to the $CO_3$ content column that when rehydration is effected by use of a sodium hydroxide solution as in Example II a better decarbonation is effected than when rehydration is effected by use of the nickel sulfate solution as in Example I.

(4) It can be seen by reference to the capacity column, that the capacity of the electrode of Example I is higher when the rehydration is effected by a nickel sulfate solution as compared with the capacity of an Example II electrode whose rehydration has been effected by a sodium hydroxide solution. This result may be ascribed to the higher value of specific surface of Example I electrodes over that of Example II electrodes.

The advantages of the purification resulting from the practice of the process of this invention as compared to the conventional electrochemical purification process of conventionally prepared electrodes are also apparent from the table.

(5) As seen from the nitrogen column, the procedural preparation of the electrode products of Examples I and II results in a more efficient denitration which should bring about a better conservation of charge.

(6) As seen in the table by reference to $CO_3$ content column of the table in Example II electrodes when sodium hydroxide rehydration is utilized, superior decarbonization occurs.

(7) Similarly, in the case of Examples I and II, electrodes as seen from the specific surface column, a more finely divided state of the active material results from the use of the heating and rehydration steps practiced in the preparation of the products of these two examples as compared with conventionally prepared electrodes in which such steps are not used subsequent to impregnating and precipitating steps.

Negative electrodes resulting from the practice of this invention are highly porous and flexible and comprise a sintered porous nickel carrier whose pores include as active negative material finely divided cadmium hydroxide and also include some inert nickel oxide as impurity but are substantially free of other impurities.

scope of the appended claims are possible and are contemplated. There is no intention, therefore, of limitation to the precise details hereinabove presented.

What is claimed is:

1. That improvement in the process of manufacturing a negative electrode for alkaline storage cells comprising the steps of providing a porous nickel carrier, impregnating pores of the carrier with a cadmium salt solution, then precipitating cadmium hydroxide in said pores accompanied by precipitation of some nickel hydroxide from attached nickel of the carrier by immersion of the impregnated carrier in an alkaline solution, subsequently washing and drying the multi-hydroxide bearing carrier, heating the multi-hydroxide bearing carrier after said drying to a temperature ranging from 200° C. to 500° C. to effect transformation of cadmium and nickel hydroxides borne by the multi-hydroxide bearing carrier into their respective oxides, then effecting rehydration only of the cadmium oxide borne in the carrier to cadmium hydroxide by immersion of the said oxide bearing carrier in an aqueous liquid maintained at a temperature of approximately 80° C. and selected from the group consisting of water, nickel sulfate solution and sodium hydroxide solution to provide a negative electrode containing as active material cadmium hydroxide in pores of said carrier and also some inert nickel oxide, then effecting a final washing and then a final drying of such electrode.

2. That improvement in the process of manufacturing a negative electrode for alkaline storage cells according to claim 1 wherein said heating is effected at a temperature of approximately 250° C. for approximately one hour.

3. That improvement in the process of manufacturing a negative electrode for alkaline storage cells according to claim 1, wherein said immersion in said aqueous liquid is maintained for approximately 1 to 2 hours.

4. That improvement in the process of manufacturing a negative electrode for alkaline storage cells according to claim 1 wherein said final drying of said such electrode is effected in decarbonated air.

5. That improvement in the process of manufacturing a negative electrode for alkaline storage cells according to claim 1 wherein said aqueous liquid is nickel sulfate solution having a concentration of approximately 2.5 g./l.

6. That improvement in the process of manufacturing a negative electrode for alkaline storage cells according to claim 1 wherein said aqueous liquid is a sodium hydroxide solution having a concentration of approximately 250 g./l.

7. That improvement in the process of manufacturing a negative electrode for alkaline storage cells according to claim 1 wherein said porous nickel carrier is a band or strip of sintered nickel.

8. That improvement in the process of preparing an electrode for an alkaline storage cell comprising the steps of providing a porous metallic carrier, impregnating pores of the carrier with an acidified metallic salt solution of desired active material, then effecting precipitation of metallic hydroxide of the metallic salt of said solution into said pores with accompanying partial precipitation also of hydroxide of the metal of the carrier attacked by said acidified metallic salt solution by immersion of the impregnated carrier in an alkaline solution, subsequently washing and drying the carrier bearing said hydroxides, thereafter heating the dried carrier bearing said hydroxides at a temperature ranging from 200° C. to 500° C. to effect conversion of the metal hydroxide of said metallic salt into its metallic oxide and also of hydroxide of the metal of the carrier into its metallic oxide, then in a heated aqueous liquid effecting rehydration of the first-named metallic oxide to reconvert it into the metallic hydroxide of said metallic salt to constitute the active material of the desired electrode without any substantial reconversion to hydroxide of said second-named metallic oxide, thereafter finally washing and finally drying the electrode resulting from said rehydration and containing in its pores as active material the hydroxide of the metal of said metallic salt solution and also some inert oxide of the metal of the carrier.

9. That improvement in the process of preparing an electrode for an alkaline storage cell according to claim 8 wherein said porous metallic carrier is a band or strip of sintered nickel, wherein said metallic salt solution is an acidified cadmium nitrate solution, wherein said alkaline solution is an alkali metal hydroxide solution, wherein said first-named metallic hydroxide is cadmium hydroxide and said second-named hydroxide is nickel hydroxide and wherein said aqueous liquid for said rehydration is selected from the group consisting of water, nickel sulfate solution and sodium hydroxide solution.

10. That improvement in the process of preparing an electrode for an alkaline storage cell according to claim 9 wherein during said rehydration said aqueous liquid is maintained at a temperature of approximately 80° C. and the duration of said rehydration is from approximately 1 to approximately 2 hours.

11. That improvement in the process of preparing an electrode for an alkaline storage cell according to claim 10 wherein said aqueous liquid is a nickel sulfate solution having a concentration of approximately 2.5 g./l.

12. That improvement in the process of preparing an electrode for an alkaline storage cell according to claim 10 wherein said aqueous liquid is a sodium hydroxide solution having a concentration of approximately 250 g./l.

13. That improvement in the process of manufacturing a negative electrode for an alkaline storage cell comprising the steps of providing a porous sintered nickel carrier strip, immersing said strip in an acidified cadmium nitrate solution to impregnate pores of said carrier strip, then immersing the so-impregnated carrier strip into an alkaline solution of an alkali metal to precipitate cadmium hydroxide from the first-named solution into the pores of said strip with accompanying precipitation of nickel hydroxide from attacked nickel of the carrier strip in said pores, then washing and drying the carrier strip bearing said precipitated cadmium hydroxide and nickel hydroxide, thereafter effecting transformation of said cadmium hydroxide and nickel hydroxide borne by the carrier strip respectively to cadmium oxide and nickel oxide by heating of the carrier strip bearing said hydroxides at a temperature ranging from 200° C. to 500° C. for a period of approximately one hour, then immersing the carrier strip now bearing said cadmium and nickel oxides for approximately 1 to approximately 2 hours in an aqueous liquid maintained at a temperature of approximately 80° C. and selected from the group consisting of water, sodium sulfate solution and sodium hydroxide solution to effect rehydration and reconversion only of the cadmium oxide borne by the carrier strip to cadmium hydroxide to constitute active negative material in the carrier strip without any substantial reconversion of nickel oxide borne by the carrier strip to nickel hydroxide and thereafter finally washing and finally drying the resulting carrier strip then containing cadmium hydroxide as active negative material and inert nickel oxide in strip pores to provide the negative electrode.

14. That improvement in the process of manufacturing a negative electrode from an alkaline storage cell according to claim 13, wherein said aqueous solution is sodium sulfate solution at a concentration of 2.5 g./l., and the last-named drying is effected in decarbonated air.

15. That improvement in the process of manufacturing a negative electrode according to claim 13, wherein said aqueous solution is sodium hydroxide at a concentration of 250 g./l. and the last-named drying is effected in decarbonated air.

References Cited

UNITED STATES PATENTS

| | | | |
|---|---|---|---|
| 2,831,044 | 4/1958 | Bourgault et al. | 136—29 |
| 2,952,570 | 9/1960 | Heuninckx | 136—24 XR |
| 3,068,310 | 12/1962 | Casey et al. | 136—24 |
| 3,489,612 | 1/1970 | Falk | 136—24 |
| 3,582,403 | 6/1971 | Owen | 136—24 |

ANTHONY SKAPARS, Primary Examiner

U.S. Cl. X.R.

136—75